3,086,951
**METHOD OF PREPARING UNMILLED POLYCHLO-
ROPRENE-PHENOL FORMALDEHYDE ADHE-
SIVE SOLUTION, AND RESULTANT PRODUCT**
Raymond G. Wile, Manor Township, Lancaster County,
  Pa., assignor to Armstrong Cork Company, Lancaster,
  Pa., a corporation of Pennsylvania
No Drawing. Filed Apr. 29, 1960, Ser. No. 25,517
2 Claims. (Cl. 260—32.8)

This invention relates generally to adhesives, and more particularly to rubber-base adhesives. Still more particularly the invention relates to solvent-type neoprene-base adhesive compositions possessing excellent shear strength.

Solvent-type neoprene adhesives have long been made by producing blends of neoprene, modifying or reinforcing resin, and a filler; the filler may also serve as an acid acceptor and as a curing accelerator. These three primary ingredients are taken up in a solvent or solvent system for the rubber. The resin may be soluble or merely dispersible in the solvent. The modifying or reinforcing resin may be any of the known modifying resins, each of which is generally selected to produce the particular desired properties in the finished adhesive. These resins are compatible with the neoprene. A wide variety of modifying resins is known. Examples of such resins described in the patent literature are resorcinol-aldehyde resin in U.S. 2,128,635; oil-soluble, heat-advancing phenol-aldehyde resin in U.S. 2,211,048 and 2,610,910; coumarone-indene resins in U.S. 2,319,659; polymerized cashew nut shell liquid in U.S. 2,323,130; wood rosin dispersible in the solvent in U.S. 2,376,854; phenol-furfural resin in U.S. 2,394,375; a liquid phenol-formaldehyde resin in U.S. 2,448,985; and a cresol formaldehyde tung oil complex in U.S. 2,122,691.

It is the primary object of the present invention to present a solvent-type adhesive containing neoprene, a fortifying or reinforcing resin, and a filler which will possess increased shear strength at a lower solids content than prior adhesives. It is a further object of the present invention to present a simplified and less expensive process of making a solvent-type neoprene adhesive containing filler and reinforcing resin.

These objects are obtained in a surprisingly straightforward and effective manner. The invention contemplates a solvent-type neoprene adhesive containing filler and modifying resin wherein the adhesive is formed by dissolving unmilled polychloroprene in a solvent therefor to form a rubber solution free of any undissolved solids. Separately there is formed a mixture of a modifying resin, a solvent or dispersing medium therefor, and a filler comprising an alkaline earth metal oxide. This mixture is then ground in a grinding mill to dissolve or disperse the resin and to reduce the agglomerate size of the filler. The ground mixture is then combined with the rubber solution to form the finished adhesive.

One of the important features of the present invention is the use of unmilled neoprene. By unmilled is meant that the neoprene is not subjected to intensive mixing either on a rubber mill or Banbury mixer or any other kind of intensive mixer. Milling appears to reduce the molecular weight of the neoprene molecules by chain scission, hence the viscosity of the neoprene is reduced. The neoprene as purchased, usually in the form of nubbins, or rope chips, is simply taken up in a solvent therefor directly in order to form a rubber solution. The usual solvents for the neoprene will be aromatic hydrocarbons such as toluol, ketones such as methyl isobutyl ketone, mixtures thereof, naphthenic petroleum solvents, chlorinated hydrocarbons, or esters when used in admixture with one or more different solvents. The preferred solvent system for neoprene is a mixture of a ketone such as methyl ethyl ketone or acetone, and a hydrocarbon solvent, for example toluol and certain of the petroleum fractions. Since a rubber solution containing no undissolved solid is desired, sufficient of the solvent or solvent system must be used to dissolve the rubber. The exact amount of solvent will depend on the solubility of the neoprene in that particular solvent or solvent system. Generally speaking, the amount of solvent to be used will be about 200%–2000% by weight based on the weight of the rubber, although preferably an amount of solvent of 300%–500% by weight based on the weight of the rubber will normally be used. This preferred amount yields a rubber solution having a convenient rubber content for subsequent blending with the ground paste.

The rubber solution may be prepared simultaneously with the preparation of the paste or at any other convenient time.

Although the modifying resins may be of any desirable kind compatible with neoprene, as mentioned earlier, the oil-soluble, heat-advancing phenol-formaldehyde resins described in U.S. 2,058,797-Honel are the modifying resins of choice. The resin, whatever its nature, is dissolved or otherwise dispersed in a solvent or dispersing medium for the resin, which solvent or dispersing medium is compatible with the rubber solution described earlier. Thus, preferably, the solvent used to take up the modifying resin will be one of those solvents mentioned as being useful for dissolving the neoprene. The amount of modifying resin to be used will be in the range of about 5–200 parts by weight modifying resin per 100 parts by weight of the neoprene. Precise amounts within this range will be selected depending upon the properties and characteristics desired in the adhesive to be prepared. Where the oil-soluble, heat-advancing phenol-formaldehyde resin of choice is used, the preferable amount will be in the range of about 30–120 parts by weight of the heat-advancing resin per 100 parts by weight of the neoprene. The modifying resin may simply be added in any convenient form to the solvent; stirring is desirable at this point. The filler of alkaline earth metal oxide is also added to form a mixture or slurry of solvent, reinforcing resin and filler. The amount of filler to be added will be in the range of about 4–75 parts by weight filler per 100 parts by weight neoprene rubber. Preferably, however, the filler will be added in an amount of about 10–40 parts by weight filler per 100 parts by weight neoprene.

It is frequently desired to add other ingredients to the adhesive. These ingredients may include various pigments such as titanium dioxide, additional inert fillers such as clays, or special vulcanizing ingredients. Any such additional solids should be added to the solvent-modifying resin-filler slurry. It is frequently desired to add a finely-divided silicon dioxide filler to the adhesive. Once this mixture has been formed of all the ingredients other than the neoprene and the neoprene solvent, the mixture is subjected to the grinding step. This grinding step is critical to the invention since it produces several of the unexpected properties of the final adhesive.

The grinding step should be carried out in a grinding mill which grinds solid particles to a smaller particle size and which reduces the size of agglomerates. Suitable grinding mills are exemplified by ball mills, pebble mills, rod mills, paint mills, or any attrition device for reducing agglomerates and particles of particulate solids which already possess a rather fine particle size. Such mills eliminate most agglomerates of the fine particles. When the mixture of solvent, resin, and filler is passed through a grinding mill, the resin will either be swiftly dissolved in the solvent or will be rendered into an extremely finely-divided form. The alkaline earth metal oxide filler will also be deagglomerated into the fine particle size normally possessed by rubber fillers. In accordance with the grinding step of the present invention, the mixture should be subjected to grinding in the grinding mill until the agglomerates are substantially eliminated. Normally, 15 minutes' to one hour's grinding in a good ball or pebble mill will produce the agglomerate reduction required. Two or more passes through a paint mill will also generally suffice. A Hegman grind gage may be used to evaluate the fineness of grind. The Hegman gage is used in the paint industry. The gage consists of a metal block having a channel of varying depth. Numbers on the block range from zero where the channel is 0.004 inch deep to 8 where the channel is zero inches deep. Ground samples are drawn down in this channel. The ground mixture of the present invention should have Hegman readings of 5 to 8, and preferably a Hegman reading of 7. Since the dissolved rubber will not affect Hegman readings, these limits also apply to the finished adhesive.

The resulting mixture of solvent, resin, filler, and any additional solid ingredients will be found to consist of a paste at the end of the grinding period. This paste is extraordinarily stable against settling in that there is no settling of any solids after 8 weeks of standing at the preferred solids content of 55% by weight solids at a low viscosity of about 100 centipoises. The total amount of solids to be used in forming the mixture to be ground will be that amount needed to produce a final ground mixture having the desired solids content. This solids content will generally be in the range of about 30–70% by weight solids, and more preferably will be in the range of about 50–60% by weight solids.

It has been assumed in the past that the extreme fineness of the rubber fillers which are normally milled into the rubber is sufficient to form non-settling adhesives having excellent properties. This has been true. It is, however, the highly unexpected and unforseen contribution of the present invention that superior properties of the adhesive may be achieved if all the undissolved solids to be present in the final adhesive are ground in a grinding mill before being blended with the rubber solution.

Where the modifying resin is the preferred oil-soluble, heat-advancing phenol-formaldehyde resin, and where the alkaline earth metal oxide filler is magnesium oxide, it will be found that the grinding step expedites a reaction between the magnesium oxide and the phenol-formaldehyde resin to form what may be called the resin salt. This reaction rate may be enhanced by the addition of a small amount of water—say 1% by weight of the solvent system—to the mixture to be ground, or the reaction may be hastened even more by the addition of aqua ammonia thereto. In such cases, some of the magnesium oxide filler reacts with all of the resin to form a resin salt which is soluble in a toluene-ketone solvent mixture. The remainder of the magnesium oxide remains undissolved and serves as a filler, an acid acceptor, and either a curing agent or a curing accelerator for the neoprene. If any zinc oxide has been added to the mixture to be ground, the zinc oxide will not react with the resin but will remain in extremely fine form as a curing agent or curing accelerator for the neoprene, with its activity enhanced due to elimination of agglomerates. The stability against settling of the resulting paste is quite remarkable in view of the high solids content of the paste, namely in the preferred range of about 50%–60% by weight solids at low viscosity. Modifying resins other than the preferred oil-soluble, heat-advancing phenol-formaldehyde resin which possess reactivity toward alkaline earth metal oxide will react with the oxide under the grinding conditions. Thus a great many of the adhesive compositions of the present invention will contain fully reacted resin salts.

When the mixture has been suitably ground to a stable paste, the only remaining step is to blend the rubber solution prepared as described earlier with the ground paste. This blending is readily accomplished by simple agitation in any suitable container. The total solids content of the final adhesive composition will generally be in the range of about 10% to about 65% by weight. The amount of rubber in the final adhesive composition will generally be in the range of about 5 to about 30% by weight, and will more preferably be in the range of about 8 to about 20% by weight.

The following examples illustrate several embodiments of the invention.

*Example 1*

Two adhesives were made of the following ingredients in the following amounts:

| Ingredients | Adhesive A, Pounds | Adhesive B, Pounds |
| --- | --- | --- |
| Neoprene | 56 | 60 |
| Magnesium Oxide | 8.4 | 9 |
| Silicon Dioxide (Hi-Sil) | 11.2 | 12 |
| Oil-Soluble, Heat-Advancing Phenol-Formaldehyde Resin (CKR 1634) | 39.2 | 42 |
| Aqua Ammonia | 0.8 | 0.84 |
| Chlorinated Rubber | 5.6 | 6 |
| Toluol | 61 | 59.25 |
| Acetone | 61 | 59.25 |
| Petroleum Fraction, Rubber Solvent (Benzosol) | 183 | 177.50 |

It will be noted that Adhesive A is identical with Adhesive B save that Adhesive A contains 28% by weight solids and Adhesive B contains 30% by weight solids.

Adhesive B was prepared in a standard manner by placing the neoprene in a Banbury mixer for 3 minutes, adding the magnesium oxide and continuing the mixing for 2 minutes, adding the other solids except the oil-soluble, heat-advancing resin, and mixing for a total mixing time of 9–10 minutes while maintaining the temperature at less than 250° F. The mixture was then dropped to a rubber mill where it was milled for an additional 10 minutes before sheeting off to cool. The resin was dissolved in a portion of the toluene and about 4 pounds of the magnesium oxide was stirred therein followed by the addition of the ammonium hydroxide. Reaction was complete in half an hour. The sheeted rubber was cut into the resin salt solution with stirring until all the rubber had been dissolved. The benzosol solvent was added completely to the mixture in order to adjust the final viscosity of the adhesive to 900–1200 centipoises, the desired viscosity range for this adhesive.

In making Adhesive A, all of the oil-soluble, heat-advancing phenol-formaldehyde resin was added to 49 pounds of toluene along with all the magnesium and silicon dioxide and chlorinated rubber and ammonium hydroxide. The mixture was charged to a pebble-containing grinding mill equipped with a stirrer known as an Attritor, charging requiring 15 minutes during which time the Attritor was in operation. The Attritor continued mixing for 30 minutes after charging. A reading made with the Hegman grind gage after the 30 minutes gave a Hegman reading of 7. When the same ingredients in the same relative amounts were thoroughly blended in a Waring Blendor, the Hegman reading was 4. The rubber was added to 12 pounds of toluene plus 61 pounds of acetone plus most of the benzosol to give a 20% rubber content solution. The rubber was dissolved in the solvent system with no milling or intensive mixing of any kind; the nubbins were simply dropped into the solvent system and stirred until dissolved.

The rubber solution was admixed with the ground paste to form the adhesive composition having a viscosity of 900–1200 centipoises.

The two adhesives were subjected to identical tests for shear strength at room temperature in that identical bonds were pulled at the rate of 0.05 inch per minute at 70° F. Adhesive B failed at 1343 pounds per square inch. Adhesive A failed at 1806 pounds per square inch. It must be emphasized that Adhesive A had a solids content 2% lower than that of Adhesive B, yet Adhesive A had the higher shear strength. Other comparative tests such as a 90° peel test coupled with aging at different temperatures and different periods of time showed that Adhesive A was slightly but immaterially lower in properties.

Another factory run using the same amounts of the same ingredients as those mentioned above except for a different grade of neoprene produced an Adhesive B which failed in the shear strength test at 1074 pounds per square inch while Adhesive A had a strength of 1385 pounds per square inch.

Example 2

Two adhesives were made of ingredients present in the same ratio according to Example 1. Following are the formulations:

| Ingredients | Adhesive A, Pounds | Adhesive B, Pounds |
|---|---|---|
| Neoprene | 62.5 | 68 |
| Magnesium Oxide | 2.47 | 2.69 |
| Zinc Oxide | 3.08 | 3.36 |
| Chlorinated Rubber | 6.2 | 6.77 |
| Oil-Soluble, Heat-Advancing Phenol-Formaldehyde Resin (CKR-1282) | 20.5 | 22.3 |
| Rubber Solvent | 212 | 206 |
| Methyl Ethyl Ketone | | 110 |
| Acetone | 56.5 | |
| Toluol | 56.5 | |

Adhesive A has a 23% by weight solids content and Adhesive B has a 25% by weight solids content. The acetone-toluol solvent system used in Adhesive A was deliberately substituted for the more expensive methyl ethyl ketone. Adhesive A contains the unmilled neoprene and the ground mixture of solvent-resin-solids.

The dynamic shear strength test performed at room temperature showed that Adhesive B had a bond strength of 1319 pounds per square inch and Adhesive A had a bond strength of 1422 pounds per square inch. Other properties such as the 90° peel strength test run in the Scott tester showed that Adhesive A had slightly but immaterially higher properties than Adhesive B.

Example 3

Into a container was placed 411 pounds of toluene, 351 pounds of an oil-soluble, heat-advancing phenol-formaldehyde resin (CKR-1634), 49 pounds of magnesium oxide, and one pound of water. The mixture was stirred for one hour at room temperature in order that the magnesium oxide would react with the resin; the slight excess of magnesium oxide remained suspended in the resin salt solution. Exactly 450 pounds of this resin salt solution along with 91 pounds of additional magnesium oxide, 78 pounds of finely-divided silicon dioxide (Hi Sil), and 39 pounds of zinc oxide were mixed and passed to a three-roll paint mill. The mixture was passed through the paint mill twice. Separately, 780 pounds of unmilled neoprene was dissolved in a mixture of 1440 pounds of rubber solvent, 871 pounds methyl ethyl ketone, 661 pounds acetone, and 145 pounds of toluol. Stirring was maintained until all the unmilled neoprene dissolved in the solvent system.

An adhesive composition was formed by admixing 371 pounds of the untreated resin salt solution prepared as described above, 650 pounds of the ground paste prepared as described above, and 660 pounds of the rubber solution prepared as described above.

The resulting adhesive possessed excellent room temperature shear strength.

Example 4

A solution was prepared of 58 pounds of toluol, 44 pounds of oil-soluble, heat-advancing phenol-formaldehyde resin (CKR-1634), 4 pounds of magnesium oxide and 1 pound of aqua ammonia. This mixture was allowed to react for one hour with stirring to form the resin salt.

A mixture was formed using 56 pounds of the above-described solution, 18 pounds by weight finely-divided silicon dioxide (Hi Sil), and 8 pounds magnesium oxide. The mixture was charged to a ball mill and was ground in the ball mill for one hour before discharge.

A rubber solution was prepared by dissolving 60 pounds of neoprene in a solvent system consisting of 43.4 pounds of toluene, 59.5 pounds of acetone, and 99.5 pounds of a petroleum rubber solvent (benzosol). The mixture was stirred until the rubber dissolved.

An adhesive composition was prepared by admixing 81 pounds of the rubber solution with 54 pounds of the ball milled slurry, and 27 additional pounds of the resin salt solution in which had been dissolved six pounds of chlorinated rubber.

An excellent adhesive resulted.

Example 5

Into a ball mill having a capacity of 3 cubic feet was placed a charge of 35 pounds of toluol, 60 pounds of a terpene phenolic resin (Durez 219), 20 pounds of magnesia and 1.5 pounds of water. The ball mill was rotated at 37 revolutions per minute for two hours, giving a Hegman fineness-of-grind reading of 7.

While the ball mill charge was being ground, 20 pounds of neoprene in the form of rope chips was stirred and dissolved into 80 pounds of toluol to form a rubber solution.

To the 100 pounds of rubber solution was added 27 pounds of the ball milled paste and 50 pounds of a rubber solvent, all of which were stirred together.

The thoroughly blended mixture formed an excellent neoprene adhesive having unusually high shear strengths at relatively low solids content as compared with an adhesive using the same ingredients but using milled neoprene without the additional grinding step for the resin and filler.

I claim:
1. A method of preparing a polychloroprene-base adhesive characterized by excellent shear strength which comprises the steps of
    preparing a first solution by dissolving unmilled polychloroprene in from 300 to 500 percent by weight of an organic solvent for polychloroprene based upon the weight of said polychloroprene,
    preparing a second solution by dissolving an oil-soluble, heat-advancing phenol-formaldehyde resin, with stirring, in an organic solvent for polychloroprene which is compatible with said first solution, the amount of said phenol-formaldehyde resin being from 30 to 120 parts by weight per 100 parts by weight of said polychloroprene in said first solution,
    adding to said second solution from 10 to 40 parts by weight of an alkaline earth metal oxide per 100 parts by weight of said polychloroprene in said first solution to form a slurry of said metal oxide having a solids content of from 50 to 60 percent by weight of solids, grinding said slurry to reduce the fineness of said alkaline earth metal oxide to a reading of 5 to 8 on a Hegman grind gage and provide stability against settling, and mixing said first and second solutions, with simple agitation, to provide an adhesive composition having a total solids content of from about 10 to about 65 percent.

2. A polychloroprene-base adhesive having high shear strength produced by the process of claim 1.

References Cited in the file of this patent

UNITED STATES PATENTS

| | | |
|---|---|---|
| 2,459,739 | Groten et al. | Jan. 18, 1949 |
| 2,481,879 | Ross | Sept. 13, 1949 |
| 2,610,910 | Thomson | Sept. 16, 1952 |
| 2,918,442 | Gerrard et al. | Dec. 22, 1959 |
| 2,963,387 | Herr et al. | Dec. 6, 1960 |